(12) United States Patent
Hogg

(10) Patent No.: US 8,139,310 B1
(45) Date of Patent: Mar. 20, 2012

(54) FLY HEIGHT SENSOR CONTROL CIRCUIT

(75) Inventor: Dennis W. Hogg, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 34 days.

(21) Appl. No.: 12/683,364

(22) Filed: Jan. 6, 2010

(51) Int. Cl.
*G11B 21/02* (2006.01)
*G11B 5/02* (2006.01)

(52) U.S. Cl. .............................. 360/75; 360/25; 360/69

(58) Field of Classification Search ..................... None
See application file for complete search history.

(56) References Cited

U.S. PATENT DOCUMENTS

| | | | |
|---|---|---|---|
| 5,527,110 A | 6/1996 | Abraham et al. | |
| 6,088,176 A | 7/2000 | Smith et al. | |
| 6,417,981 B1 | 7/2002 | Smith | |
| 6,452,735 B1 | 9/2002 | Egan et al. | |
| 6,801,376 B2 | 10/2004 | Smith | |
| 7,158,325 B1 | 1/2007 | Hu et al. | |
| 7,280,301 B1 | 10/2007 | Jackson et al. | |
| 7,423,830 B2 | 9/2008 | Ma et al. | |
| 7,436,620 B1 | 10/2008 | Kang et al. | |
| 7,440,220 B1 | 10/2008 | Kang et al. | |
| 7,457,073 B2 | 11/2008 | Kurita et al. | |
| 7,489,466 B2 | 2/2009 | Knigge et al. | |
| 7,492,543 B2 | 2/2009 | Mitsunaga et al. | |
| 7,508,617 B1 | 3/2009 | Mak et al. | |
| 7,796,356 B1 | 9/2010 | Fowler et al. | |
| 7,800,858 B1 * | 9/2010 | Bajikar et al. | 360/75 |
| 2002/0097513 A1 | 7/2002 | Ng et al. | |
| 2007/0052088 A1 | 3/2007 | Tsurume et al. | |
| 2007/0077691 A1 | 4/2007 | Watanabe | |
| 2007/0188908 A1 | 8/2007 | Kurita et al. | |
| 2007/0206314 A1 | 9/2007 | DeRosa et al. | |
| 2007/0268615 A1 | 11/2007 | McFadyen et al. | |
| 2008/0084628 A1 | 4/2008 | Ohta et al. | |
| 2008/0100950 A1 | 5/2008 | Mitsunaga et al. | |
| 2008/0100965 A1 | 5/2008 | Oki | |
| 2008/0137225 A1 | 6/2008 | Duan et al. | |
| 2008/0186621 A1 | 8/2008 | Partee | |
| 2008/0212226 A1 | 9/2008 | Uji et al. | |
| 2008/0218891 A1 | 9/2008 | Gubbins et al. | |
| 2008/0218898 A1 | 9/2008 | Yamashita et al. | |
| 2008/0225426 A1 | 9/2008 | Roy et al. | |
| 2009/0059416 A1 | 3/2009 | Okada et al. | |

OTHER PUBLICATIONS

E. Schreck, et al., "Thin Film Thermocouple Sensors for Measurement of Contact Temperatures During Slider Asperity Interaction on Magnetic Recording Disks", IEEE Transactions on Magnetics, vol. 28, No. 5, Sep. 1992, pp. 2548-2550.

(Continued)

*Primary Examiner* — K. Wong

(57) ABSTRACT

A disk drive is disclosed comprising a disk, a head for writing data to the disk, a first touchdown sensor, a second touchdown sensor, and control circuitry comprising a first current source coupled to the first touchdown sensor and a second current source coupled to the second touchdown sensor, the control circuitry operable to determine a common mode voltage between the first touchdown sensor and the second touchdown sensor, adjust the first current source and the second current source until the common mode voltage exceeds a first threshold, determine a differential voltage between the first touchdown sensor and the second touchdown sensor, adjust the first current source and the second current source until the differential voltage exceeds a second threshold, and detect a touchdown event based on the differential voltage exceeding a third threshold.

21 Claims, 10 Drawing Sheets

OTHER PUBLICATIONS

A.H.Z. Ahmed, et al., "Characterization of an Amorphous GexSi1-xOy Microbolometer for Thermal Imaging Applications", IEEE Tranactions on Electron Devices, vol. 52, No. 8, Aug. 2005, pp. 1900-1906.

Lin Han, et al., "A High Performance Uncooled a-Si TFT Infrared Sensor", Proceedings of the 1st IEEE International Conference on Nano/Micro Engineered and Molecular Systems, Jan. 18-21, 2006, Zhuhai, China, pp. 631-634.

Enrique Iborra, et al., IR Uncooled Bolometers Based on Amorphous GexSi1-xOy on Silicon Micromachined Structures, Journal of Microelectromechanical Systems, vol. 11, No. 4, Aug. 2002, pp. 322-329.

A. Torres, et al., "Uncooled micro-bolometer based on amorphous germanium film", Journal of Non-Crystalline Solids, vol. 329 (2003), pp. 179-183.

U.S. Appl. No. 12/435,298 to Bajikar et al., filed on May 4, 2009, 24 pages.

* cited by examiner

FLY HEIGHT SENSOR CONTROL CIRCUIT

CROSS REFERENCE TO RELATED APPLICATIONS

This application is related to U.S. patent application Ser. No. 12/435,298, entitled "DIFFERENTIAL HEAD INTEGRATED TOUCHDOWN SENSORS FOR HARD DISK DRIVES", filed on May 4, 2009 and herein incorporated by reference.

BACKGROUND

Disk drives typically use heads residing on sliders to read from and write to the magnetic media. Read and write transducers residing in the head are flown at a small, controlled spacing above the magnetic medium during read and write operations. To determine the controlled spacing, it is desirable for the disk drive to detect at what point the head contacts the media, known as a touchdown event.

For example, heads typically use a thermal actuator that generates heat to control the head-media spacing. Heat generated by the thermal actuator causes local thermal expansion of the head, which locally reduces the spacing between the head and magnetic media. The thermal actuator can be driven to induce sufficient heating for contact between the head and media. This touchdown is intentional and may be performed on each drive during initial drive calibration.

Touchdown may be detected in the drive operation as well as in testing. Conventional touchdown detection may be performed using a variety of techniques. For example, touchdown may be detected through disk slow down, readout channel noise, strain gauges, PES variations, and/or acoustic emission.

Accordingly, what is needed is a system and method for providing improved touchdown detection.

DETAILED DESCRIPTION OF THE PREFERRED EMBODIMENTS

Figure 1A:
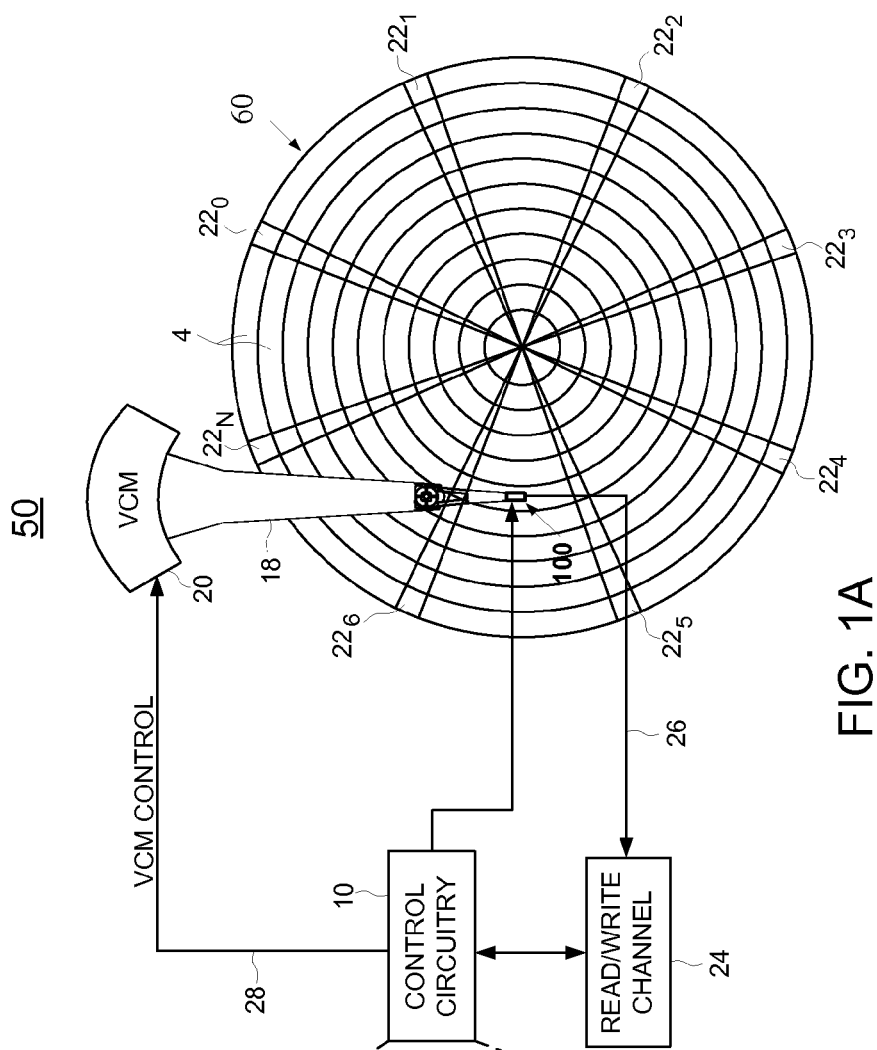
FIG. 1A shows a disk drive according to an embodiment of the present invention comprising a disk, a head actuated over the disk, and control circuitry.
Figure 1B:
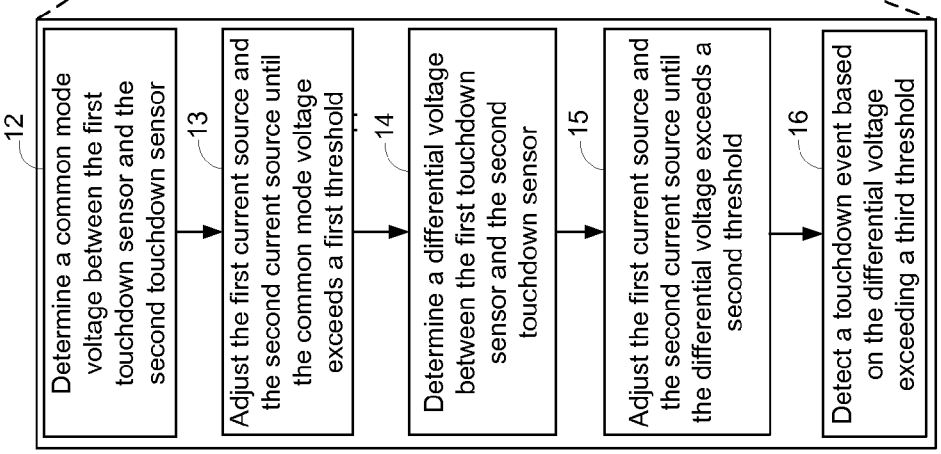
FIG. 1B is a flow diagram of acts executed by the control circuitry according to an embodiment of the present invention.

FIG. 1A shows a disk drive 50 according to an embodiment of the present invention comprising a disk or media 60 having a plurality of tracks 4, and a head 100 actuated over the disk 60. The disk drive further comprises control circuitry 10 which executes the flow diagram of FIG. 1B wherein at step 12 the control circuitry 10 determines a common mode voltage between a first touchdown sensor and a second touchdown sensor. At step 13 the control circuitry 10 adjusts a first current source and a second current source until the common mode voltage exceeds a first threshold, at step 14 control circuitry 10 determines a differential voltage between the first touchdown sensor and the second touchdown sensor, at step 15 control circuitry 10 adjusts the first current source and the second current source until the differential voltage exceeds a second threshold, and at step 14 control circuitry 10 detects a touchdown event based on the differential voltage exceeding a third threshold.

Any suitable control circuitry 10 may be employed to implement the embodiments of the present invention. In one embodiment, the control circuitry 10 comprises a microprocessor executing instructions, the instructions being operable to cause the microprocessor to perform the steps of FIG. 1B as well as other functions described herein. The instructions may be stored in any computer-readable medium.

In one embodiment, they may be stored on a non-volatile semiconductor memory external to the microprocessor, or integrated with the microprocessor in a system on a chip (SOC). In another embodiment, the instructions are stored on the disk 60 and read into a volatile semiconductor memory when the disk drive is powered on. In yet another embodiment, the control circuitry 10 comprises suitable logic circuitry, such as state machine circuitry.

In the embodiment of FIG. 1A, the head 100 is connected to a distal end of an actuator arm 18 which is rotated about a pivot by a voice coil motor (VCM) 20 in order to actuate the head 100 radially over the disk 60. The VCM 20 comprises a voice coil which, when energized with current by the control circuitry 10, generates a magnetic flux which interacts with the magnetic flux from permanent magnets to generate a torque that rotates the actuator arm 18 about the pivot. Also in the embodiment of FIG. 1A, the disk 60 comprises a plurality of embedded servo sectors $22_0$-$22_N$ each comprising coarse head position information, such as a track address, and fine head position information, such as servo bursts. As the head 100 passes over each servo sector, a read/write channel 24 processes the read signal 26 emanating from the head 100 to demodulate the position information. The control circuitry 10 processes the position information to generate a control signal 28 applied to the VCM 20. The VCM 20 rotates the actuator arm 18 in order to position the head 100 over a target track during the seek operation, and maintains the head 100 over the target track during a tracking operation.

Figure 2:
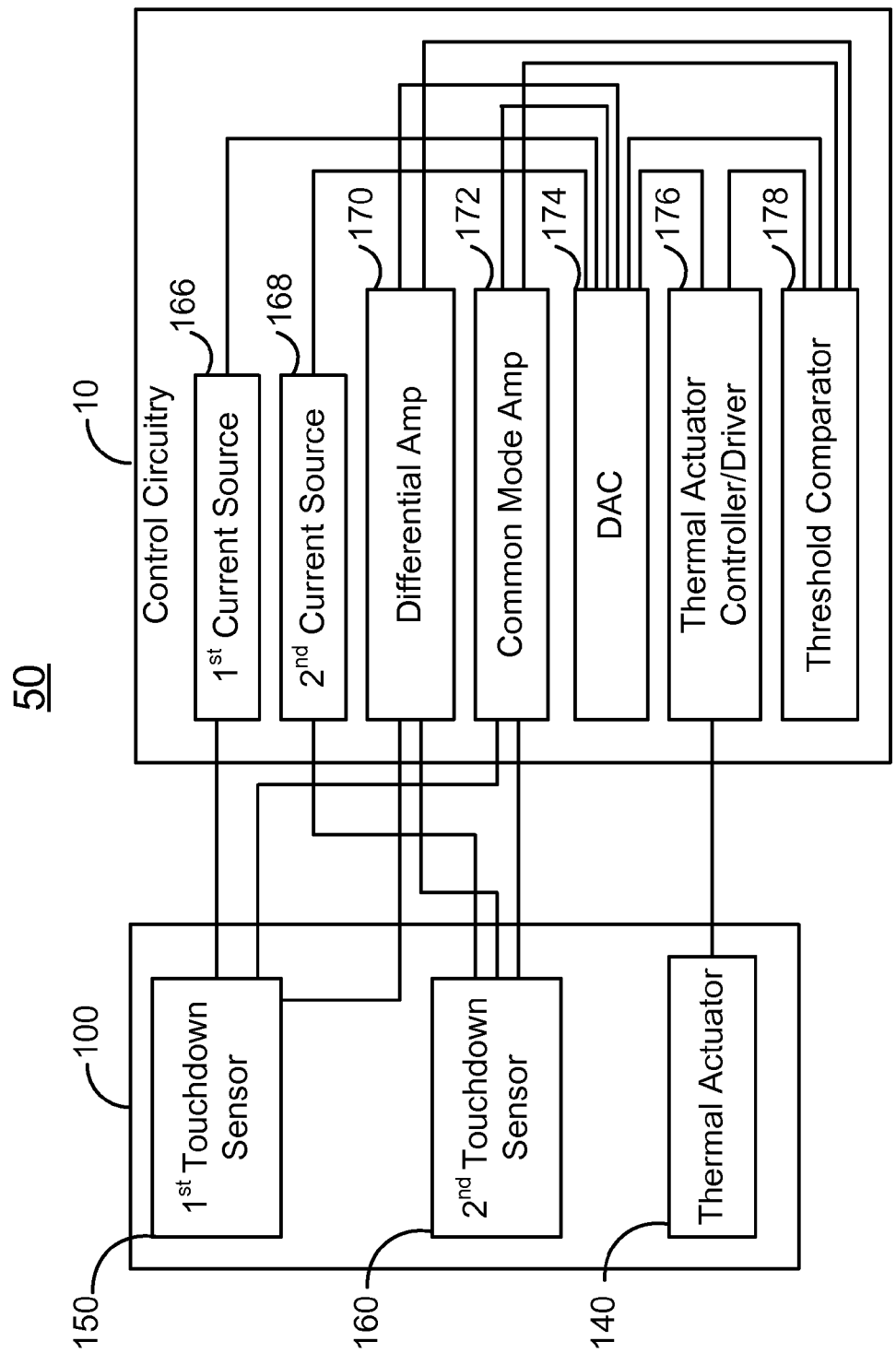
FIG. 2 depicts a block diagram of the disk drive for detecting a touchdown comprising the head and the touchdown sensor control circuitry according to one embodiment.

FIG. 2 depicts a block diagram of the disk drive 50 for detecting a touchdown comprising the head 100 and the touchdown sensor control circuitry 10 according to one embodiment. For simplicity, certain components are omitted. In addition, for clarity, FIG. 2 is not drawn to scale. The head 100 comprises a thermal actuator 140, a first touchdown sensor 150, and a second touchdown sensor 160. In one embodiment, the first touchdown sensor 150 and the second touchdown sensor 160 comprise thermistors.

The touchdown sensor control circuitry 10 comprises a first current source 166 and a second current source 168. The first current source 166 and the second current source 168 may be coupled to the first touchdown sensor 150 and the second touchdown sensor 160, respectively. The control circuitry 10 may further comprise a differential amplifier 170, a common mode amplifier 172, a digital/analog converter (DAC) 174, a thermal actuator controller/driver 176, and a threshold comparator 178.

The differential amplifier 170 and the common mode amplifier 172 may also be coupled to the first touchdown sensor 150 and the second touchdown sensor 160, respectively. The thermal actuator controller/driver 176 may be coupled to the thermal actuator 140. Note that the components 166, 168, 170, 172, 174, 176, and 178 may include multiple functions and thus may have multiple sub-components. Such sub-components might be split into separate components. Components of the control circuitry 10 may be located in the disk drive 50 and/or may also be used for other purposes such as read or write operations.

The first current source 166 and the second current source 168 provide current to drive the first touchdown sensor 150 and the second touchdown sensor 160, respectively. In another embodiment, the first current source 166 and the second current source 168 might provide a voltage or otherwise drive the touchdown sensors 150 and 160.

The control circuitry 10 receives output signals from the touchdown sensors 150 and 160. The differential amplifier 170 may measure a differential voltage between the first touchdown sensor 150 and the second touchdown sensor 160. In another embodiment, analogous differential signals may be read from the touchdown sensors 150 and 160. The control circuitry 10 may convert voltages to temperatures or differential voltages to differential temperatures using known transfer functions. The common mode amplifier 172 may measure a common mode voltage between the first touchdown sensor 150 and the second touchdown sensor 160.

In one embodiment, analog signals from the differential amplifier 170 and the common mode amplifier 172 may be provided to the DAC 174 to be converted to digital signals. The DAC 174 may also provide control reference voltages to control the current output of the first current source 166 and the second current source 168.

In one embodiment, the differential amplifier 170 may be included in a preamplifier for a read sensor or other circuitry used by the head 100. The control circuitry 10 and the differential amplifier 170 may process the signals received from the touchdown sensors 150 and 160. For example, the signals from the touchdown sensors 150 and 160 may be subtracted and the difference compared to a third threshold via threshold comparator 178. Thus, the control circuitry 10 may determine whether the signals from the first touchdown sensor 150 and the second touchdown sensor 160 indicate a sufficiently large change in voltage or temperature for a sufficient interval for touchdown to be detected. Thus, through the use of the touchdown sensors 150 and 160 and control circuitry 10, touchdown may be detected.

FIG. 2 also depicts thermal actuator 140 and thermal actuator controller/driver 176. The thermal actuator controller/driver 176 may also include multiple subcomponents. The thermal actuator controller/driver 176 receives a signal from the touchdown sensor control circuitry 10 and determines the desired level of current to be driven through the thermal actuator 140. The thermal actuator controller/driver 176 also provides the desired level of current to the thermal actuator 140. The thermal actuator 140 heats the head 100 by a desired amount.

A touchdown detection control circuitry bias process will now be described according to one embodiment of the invention. The terms thermistor and touchdown sensor will be used interchangeably in the following discussion. The control circuitry 10 controls the first current source 166 and the second current source 168 to inject an initial bias current into both touchdown sensors 150 and 160, respectively. The initial bias current ($I_{initial\ bias}$) may be approximately 200 microamps according to one embodiment of the invention. Other initial bias currents may be used as well based in part on thermistor resistivity variation.

The control circuitry 10 controls the current sources 166 and 168 to provide the initial bias current ($I_{initial\ bias}$) based on outputs from the DAC 174. The common mode amplifier then measures a common mode voltage ($V_{common\ mode}$) between the touchdown sensors 150 and 160 until the common mode voltage exceeds a first threshold. For example, exceeding the first threshold may occur when the common mode voltage is approximately equal to a given voltage. In one embodiment, the common mode voltage comprises an average of the voltage across both thermistors.

In one embodiment, the initial bias current ($I_{initial\ bias}$) and the measured common mode voltage $V_{common\ mode}$ can be used to calculate an approximate resistance $R_{approx}$ according to the equation $V_{common\ mode}/I_{initial\ bias} = R_{approx}$. Utilizing the approximate resistance $R_{approx}$, the control circuitry 10 can determine an operating bias current $I_{operating\ bias\ current}$ based on a desired operating bias point $V_{operating\ bias\ point}$ (a thermistor voltage value). The desired operating bias point $V_{operating\ bias\ point}$ is selected to allow the touchdown detection circuit to operate in an optimum range. In some embodiments, the accuracy of touchdown measurements may diminish when the circuit operates close to a lower and upper limit of operation, such as close to certain power supply voltages. In one embodiment, the circuit operates at a desired operating bias point $V_{operating\ bias\ point}$ from 0.5V to 2V. In another embodiment, since the thermal actuator 140 will be activated and the head 100 will be increasing in temperature, the desired operating bias point $V_{operating\ bias\ point}$ may be set as high as possible because the addition of the heat causes the operating bias point to go down with increasing temperature.

In one embodiment, a desired operating bias point $V_{operating\ bias\ point}$ is selected to be approximately 2 volts and the operating bias current $I_{operating\ bias\ current}$ is adjusted until exceeding the first threshold of $I_{operating\ bias\ current} = 2\ Volts/R_{approx}$.

In an alternative embodiment of the invention, the control circuitry 10 controls the first current source 166 and the second current source 168 to inject a bias current $I_{operating\ bias\ current}$ into both touchdown sensors 150 and 160 until a measured common mode voltage across touchdown sensors 150 and 160 exceeds the first threshold by being approximately equal to 2 volts.

In another embodiment, the control circuitry 10 may also verify that the preferred operating current $I_{operating\ bias\ current}$ does not produce a thermistor power level that will generate a significant amount of heat on its own. Because the thermal actuator 140 will be activated during a touchdown detection mode, the heat generated by the touchdown sensors (thermistors) in some embodiments should be small compared with the heat generated by the thermal actuator 140. In one embodiment, the thermistor power may be ⅒ or less of the typical thermal actuator power. For example, a typical thermal actuator power may be approximately 50 milliwatts (mW). In this embodiment, if the power dissipated in the thermistors is more than 1/10 of the power dissipated in the thermal actuator 140, then the operating bias current $I_{operating\ bias\ current}$ delivered to the thermistors may be reduced. A new operating point $I_{operating\ bias\ current}$ can be selected according to the equation:

$$P_{thermistor\ max} = P_{thermal\ actuator}/10 = I_{operating\ bias\ current}^2 * R_{approx}.$$

Alternatively, the control circuitry 10 may control the first current source 166 and the second current source 168 to inject a bias current $I_{operating\ bias\ current}$ into both touchdown sensors 150 and 160 to produce a common mode voltage across touchdown sensors 150 and 160 to equal X volts (where X may be initially chosen to be approximately 2 volts). After adjusting $I_{operating\ bias\ current}$ to achieve the common mode voltage of approximately 2 volts, the control circuitry 10 can calculate the $I_{operating\ bias\ current}$ based on a previous knowledge of DAC reference voltage step sizes provided to the first current source 166 or the second current source 168. Thus, $P_{thermistor\ max} = V_{common\ mode} * I_{operating\ bias\ current}$.

If $P_{thermistor\ max}$ is greater than $P_{thermal\ actuator}/10$ in this embodiment, then the control circuitry 10 may reduce $I_{operating\ bias\ current}$ by decreasing the DAC setting to the first current source 166 and the second current source 168 such that $V_{common\ mode}$ is less than X volts (where X was initially chosen to be 2 volts). Then, $P_{thermistor\ max} = V_{common\ mode} * I_{operating\ bias\ current}$ can be re-calculated.

After establishing the proper operating bias current $I_{operating\ bias\ current}$, the control circuitry 10 next accounts for any mismatch in thermistor performance. The two thermistors that have been biased as described above may be ideally matched devices. However, in practice there may be some mis-match between the two devices. The two thermistor resistances may differ by an amount that may be greater than the differences that will be detected due to head disk touchdown. Once the operating bias current $I_{operating\ bias\ current}$ and common mode bias $V_{operating\ bias\ point}$ are established as above, the control circuitry 10 then cancels any differential voltage between the thermistors so that small differential changes can be detected. Thus, the control circuitry 10 may measure the differential voltage between the two thermistors 150 and 160 utilizing the differential amplifier 170. If the control circuitry 10 determines a non-zero differential voltage between the two thermistors 150 and 160, the control circuitry 10 controls the first current source 166 to add current and controls the second current source 168 to subtract current (or vice versa) until the differential voltage exceeds a second threshold. In one embodiment, the second threshold may be exceeded when it is approximately equal to zero volts.

Alternatively, the control circuitry 10 may adjust the first current source 166 and the second current source 168 until the differential voltage exceeds the second threshold by being approximately within a voltage range, such as ±2 millivolts. Alternatively, the second threshold may be approximately ±5 millivolts. Any second threshold value may be chosen based on a degree of variation in thermistor resistivity.

Figure 3:
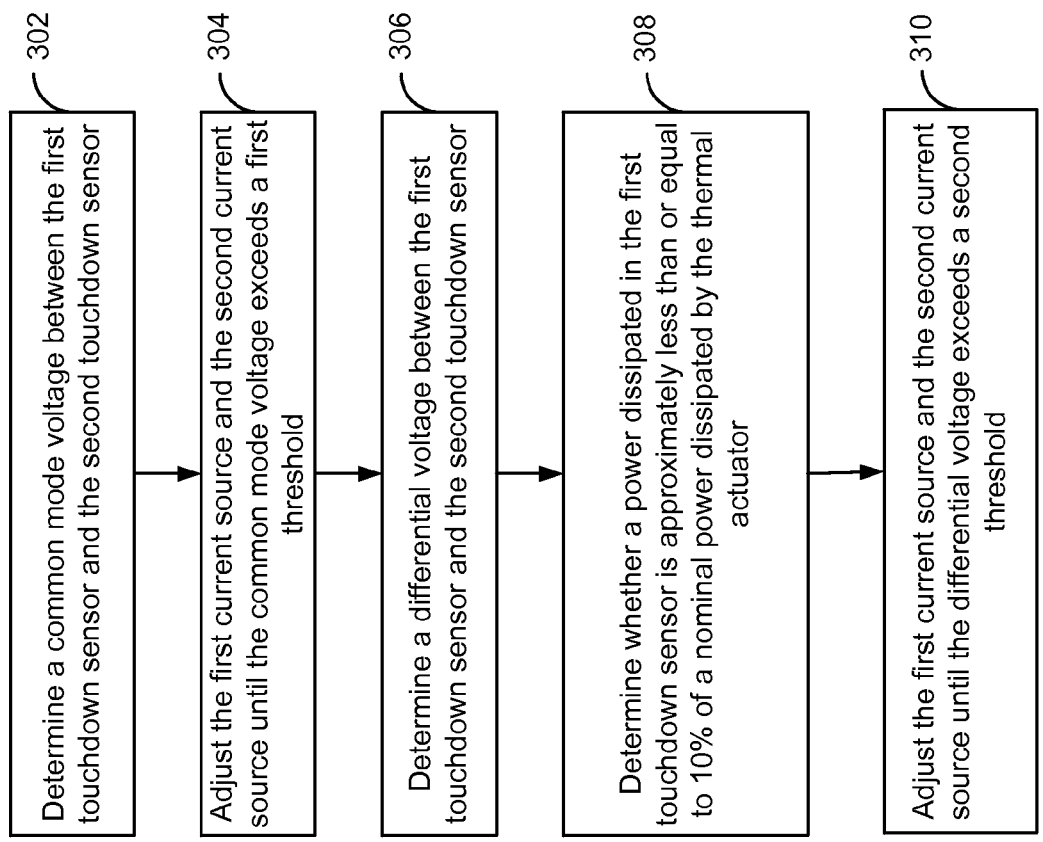
FIG. 3 depicts a method for biasing the touchdown detection control circuitry according to one embodiment.

FIG. 3 depicts a method for biasing the touchdown detection control circuitry 10 according to one embodiment. Although depicted as a flow of single steps, the steps of the method may be performed in parallel and/or continuously.

At block 302, a common mode voltage is determined between the first touchdown sensor and the second touchdown sensor. At block 304, the first current source and the second current source are adjusted until the common mode voltage exceeds a first threshold. At block 306, a differential voltage is determined between the first touchdown sensor and the second touchdown sensor. At block 308, a power dissipated in the first touchdown sensor is determined to be approximately less than or equal to 10% of a nominal power dissipated by the thermal actuator. At block 310, the first current source and the second current source are adjusted until the differential voltage exceeds a second threshold.

Figure 4:
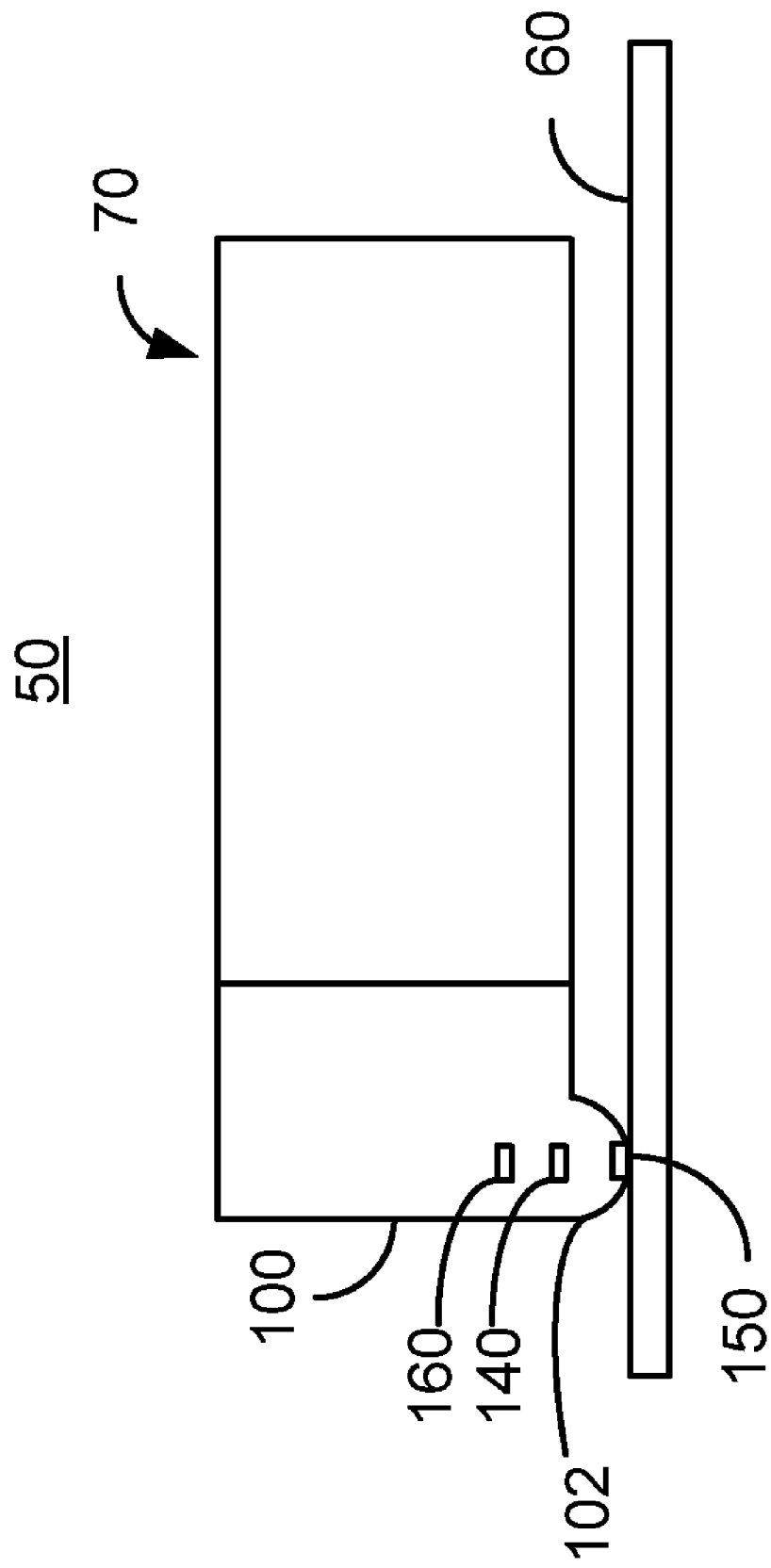
FIG. 4 is a diagram of a portion of the disk drive according to one embodiment.

FIG. 4 is a diagram of a portion of the disk drive 50 according to one embodiment. For simplicity, certain components are omitted. In addition, for clarity, FIG. 4 is not drawn to scale. The disk drive 50 comprises the media 60 and a slider 70. On the slider 70 resides head 100, which comprises the thermal actuator 140, and integrated touchdown sensors 150 and 160. Each of the touchdown sensors 150 and 160 may be a thermal sensor and, in one embodiment, the thermal sensors may be thermistors. Also, any suitable type of touchdown sensor may be used for embodiments of the present invention.

The touchdown sensor 150 in combination with the touchdown sensor 160 detects touchdown based upon the temperature of the head 100. The disk drive 50 is shown at touchdown. Consequently, the head 100 contacts the media 60 in a region termed a touchdown region. The head 100 may contact the media 60 in a region of an air-bearing surface (ABS) 102 which may also be termed a touchdown region. The slider 70 may also have an ABS portion as well (not shown). Frictional heating due to contact between the media 60 and head 100 causes a sharp increase, or jump in the local temperature of the head 100 in the region proximate to where touchdown occurs. The touchdown sensor 150 may be located in this touchdown region. Thus, the touchdown sensor 150 is able to detect the sharp increase, or jump in temperature.

In contrast, the touchdown sensor 160 may be located distal from the touchdown region on the head 50 that is in contact with the media 60. The touchdown sensor 160 may be substantially unaffected by the local temperature rise due to frictional heating in the touchdown region. However, the touchdown sensor 160 may be otherwise exposed to similar conditions as the touchdown sensor 150. The touchdown sensor 160 may thus act as a reference sensor for the touchdown sensor 150. In the absence of touchdown, the touchdown sensor 160 may be at or close to the same temperature as the touchdown sensor 150.

A difference between the temperatures detected by the touchdown sensors 150 and 160 may correspond to contact or touchdown between the head 100 and media 60. Stated differently, operation of the touchdown sensors 150 and 160 in a differential mode allows for touchdown detection for the head 100. Also, operation of the touchdown sensors 150 and 160 in a differential mode may also comprise measuring a differential voltage between touchdown sensors 150 and 160. For example, touchdown sensors 150 and 160 may comprise thermistors and a differential voltage between the thermistors may be measured to detect touchdown.

The head 100 also comprises the thermal actuator 140. As shown in FIG. 4, the thermal actuator 140 may be used to induce touchdown and otherwise control the spacing of the head 100 relative to the media 60. For example, a current may be driven through the thermal actuator 140, which generates heat in the region of the head 100. When enough heat is generated by the thermal actuator 140, sufficient thermal protrusion occurs to produce intentional touchdown. Once touchdown is detected using the touchdown sensors 150 and 160, the thermal actuator 140 may be driven at a lower power in order to ensure that there is a desired space between the head 100 and media 60 to allow the fly height to be selected and controlled.

Figure 5:
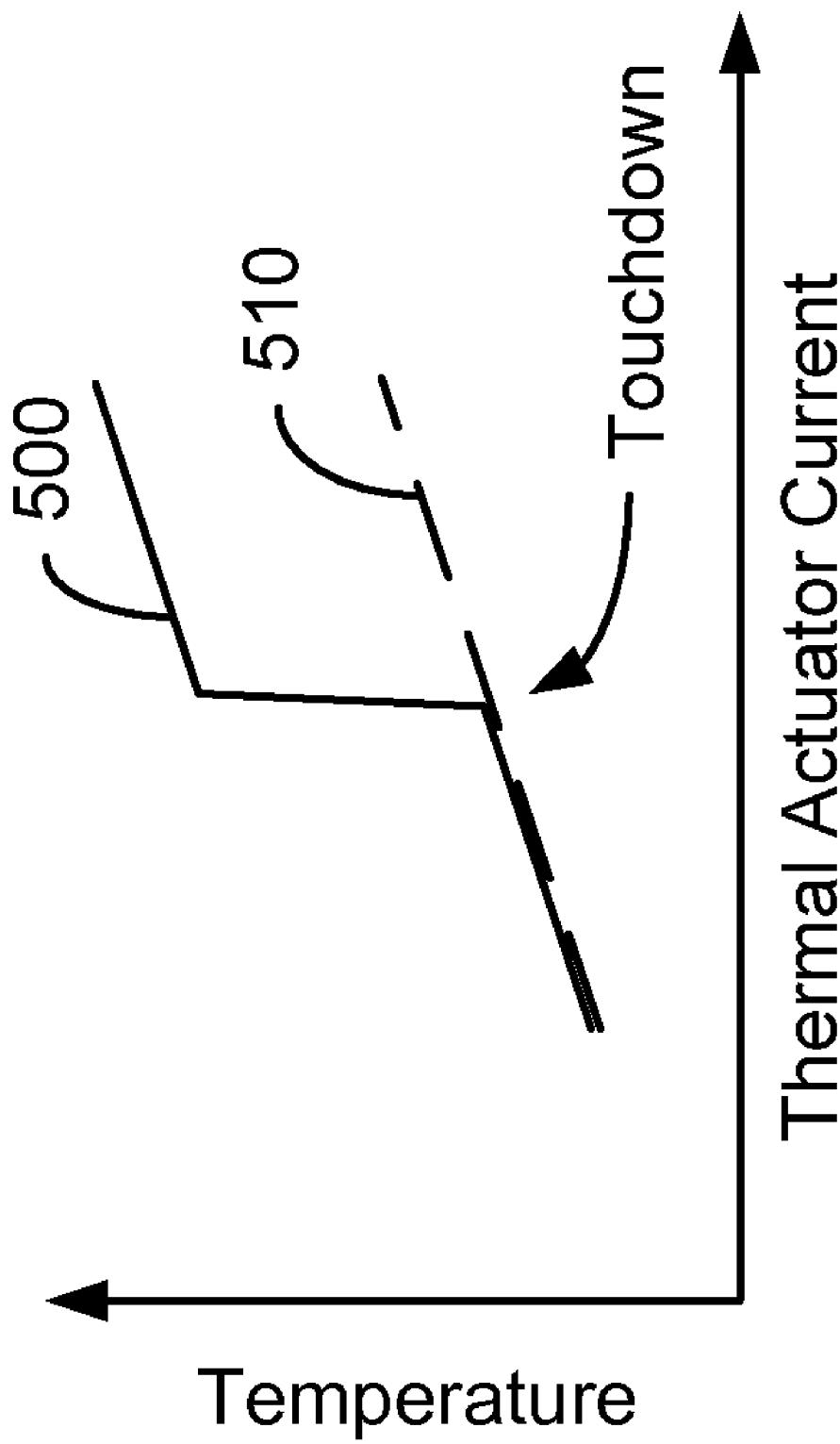
FIG. 5 depicts example curves for temperatures of the head versus actuator current according to one embodiment.

Operation of the touchdown sensors 150 and 160 may be further explained in connection with FIG. 5, which depicts example curves for temperatures of the head versus actuator current. The graphs shown in FIG. 5 are for explanatory purposes only, and are not meant to depict actual temperatures in a particular head 100. The solid line 500 depicts temperature proximate to the touchdown region (near touchdown sensor 150) versus thermal actuator current, while the dashed line 510 depicts temperature distal from the touchdown region (near touchdown sensor 160) versus thermal actuator current.

Referring to FIGS. 4 and 5, a higher current through the thermal actuator 140 generates more heat. Therefore, the temperature of the portion of the head 100 near the touchdown region and distal to the touchdown region increases with increasing thermal actuator current. This is shown in the portions of the lines 500 and 510 closer to the temperature axis. An increased temperature also corresponds to a larger thermal protrusion of the head 100 and, therefore, a smaller distance between the head 100 and media 60. When sufficient current is driven through the thermal actuator 140, thermal protrusion causes contact, or touchdown, between the media 60 and the head 100. Upon touchdown, frictional heating between the media 60 and head 100 causes a sharp increase in the local temperature of the head 100 in the touchdown region (near touchdown sensor 150). This sharp increase is shown as a distinct slope change in the solid line 500 and is labeled as corresponding to touchdown.

However, to a large extent the sharp increase in temperature may be not experienced distal from the touchdown region (near touchdown sensor 160). Consequently, the slope of the dashed line 510 remains substantially unchanged. Because different temperatures are sensed, the output signals of the touchdown sensors 150 and 160 differ. Subtracting the signal (or temperature) of the sensor 160 from the signal (or temperature) of the sensor 150 results in a smaller difference signal (or temperature difference). If this difference signal (or temperature difference) meets or exceeds a threshold, then touchdown may be determined to have occurred. Also, as shown in FIG. 3, a large change in a slope value of the solid line 500 may be measured to detect touchdown. The slope of the solid line 500 increases abruptly during the occurrence of touchdown.

Although the temperature change in the region of the touchdown sensor 150 may persist during touchdown, the temperature change may be small. In addition, the difference between temperatures at the touchdown sensors 150 and 160 may also be small. Consequently, the touchdown sensors 150 and 160 may be capable of detecting a temperature change as small as 0.1 degree Celsius. In some embodiments, each touchdown sensor 150 and 160 may be capable of detecting smaller temperature changes. For example, in some embodiments, the touchdown sensors 150 and 160 may detect temperature changes of 0.01 degree Celsius. The touchdown sensors 150 and 160 may detect such changes that last for on the order of tens of microseconds or more.

Each touchdown sensor 150 and 160 may have a negative thermal coefficient of resistivity. Thus, as the touchdown sensors 150 and 160 increase in temperature, their resistance decreases. Consequently, the sensitivity of the touchdown sensors 150 and 160 in detecting a positive temperature change and, therefore, touchdown, may be increased. Alternatively, in another embodiment, touchdown sensors 150 and 160 having a positive thermal coefficient of resistivity may be used.

Referring to FIG. 2, when intentional touchdown is to be detected, the thermal actuator controller/drive 176 increases current to the thermal actuator 140. The first touchdown sensor 150 detects a sharp increase in temperature when touchdown occurs. However, the second touchdown sensor 160 detects a temperature that does not undergo a similar jump upon touchdown. Based on the difference in the output signals from the touchdown sensors 150 and 160, the control circuitry 10 determines that touchdown has occurred. This may be achieved by comparing the difference in the sensed temperatures to the third threshold. Temperature differences at or greater than the third threshold may be considered to correspond to touchdown. Alternatively, this may be achieved by comparing the difference in the sensed voltages to the third threshold. The third threshold may comprise a differential voltage that is 1% greater than a previous differential voltage. In addition, the control circuitry 10 may measure a change in a slope value of the differential signal (voltage or temperature) to determine that touchdown has occurred. The control circuitry 10 may also measure a running average of the slope of the differential signal.

The thermal actuator controller/driver 176 may then react, for example by reducing the current to the thermal actuator 140. The thermal actuator 140 may be driven at a lower power, and the heat in the head 100 reduced. The control circuitry 10 may be further operable to store the thermal actuator power level associated with the touchdown event. Consequently, the head 100 may fly at a small, controlled spacing above the media.

Figure 6:
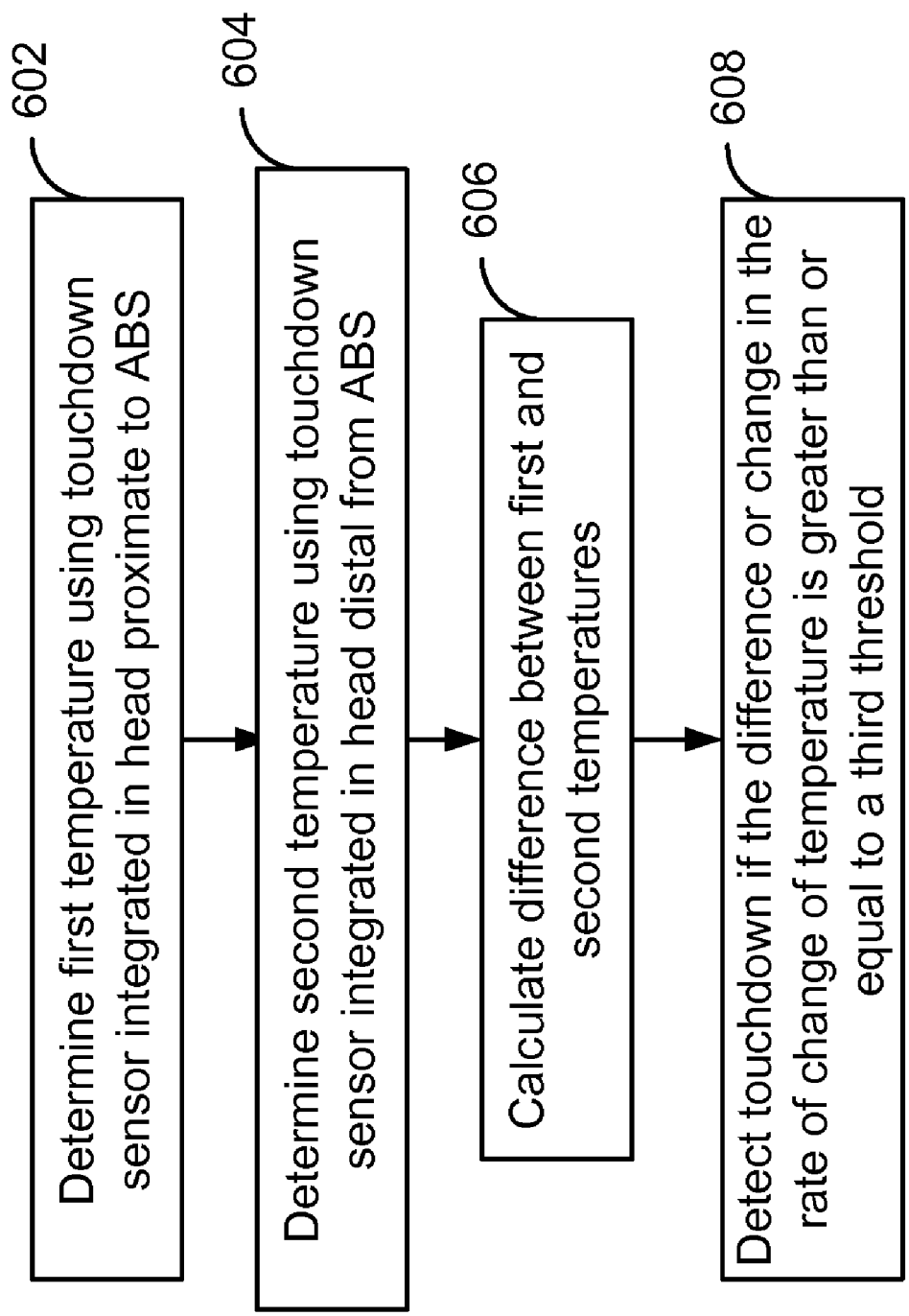
FIG. 6 depicts a method for detecting touchdown using touchdown sensors integrated into the head according to one embodiment.

FIG. 6 depicts a method for detecting touchdown using touchdown sensors integrated into head 100 according to one embodiment. Although depicted as a flow of single steps, the steps of the method may be performed in parallel and/or continuously.

A first temperature of the head 100 is detected using the first temperature sensor 150 integrated in the head 100 (block 602). A second temperature is also detected using the second temperature sensor 160 (block 604). In some embodiments, blocks 602 and 604 may be performed multiple times in order to obtain trends in the temperature of the head 100. In addition, although described as temperature detection, blocks 602 and 604 may simply include the temperature sensors 150 and 160 providing signals, such as voltage signals, to the control circuitry 10. Alternatively blocks 602 and 604 may be replaced by monitoring the difference between the temperatures sensed by the temperature sensors 150 and 160 or may be replaced by monitoring the differential voltage between the temperature sensors 150 and 160.

A difference between the first temperature and the second temperature is calculated (block 606). Block 606 may include determining an actual temperature difference, or simply determining the difference in signals from the temperatures sensors 150 and 160. Note that if the voltage or temperature difference is monitored in lieu of blocks 602 and 604, block 606 may be omitted.

Touchdown is determined to have occurred if the difference in temperatures meets or exceeds the third threshold (block 608). The third threshold may comprise a differential voltage that is 1% greater than a previous differential voltage. Alternatively, a change in the rate of change (slope) in temperature (or temperature differential) with actuator current may be compared to the third threshold. In one embodiment, touchdown is determined to have occurred if the difference or the change in slope in temperature meets or exceeds the third threshold for a certain amount of time. The control circuitry 10 may also be operable to measure a running average of the slope of the differential voltage.

Figure 7:
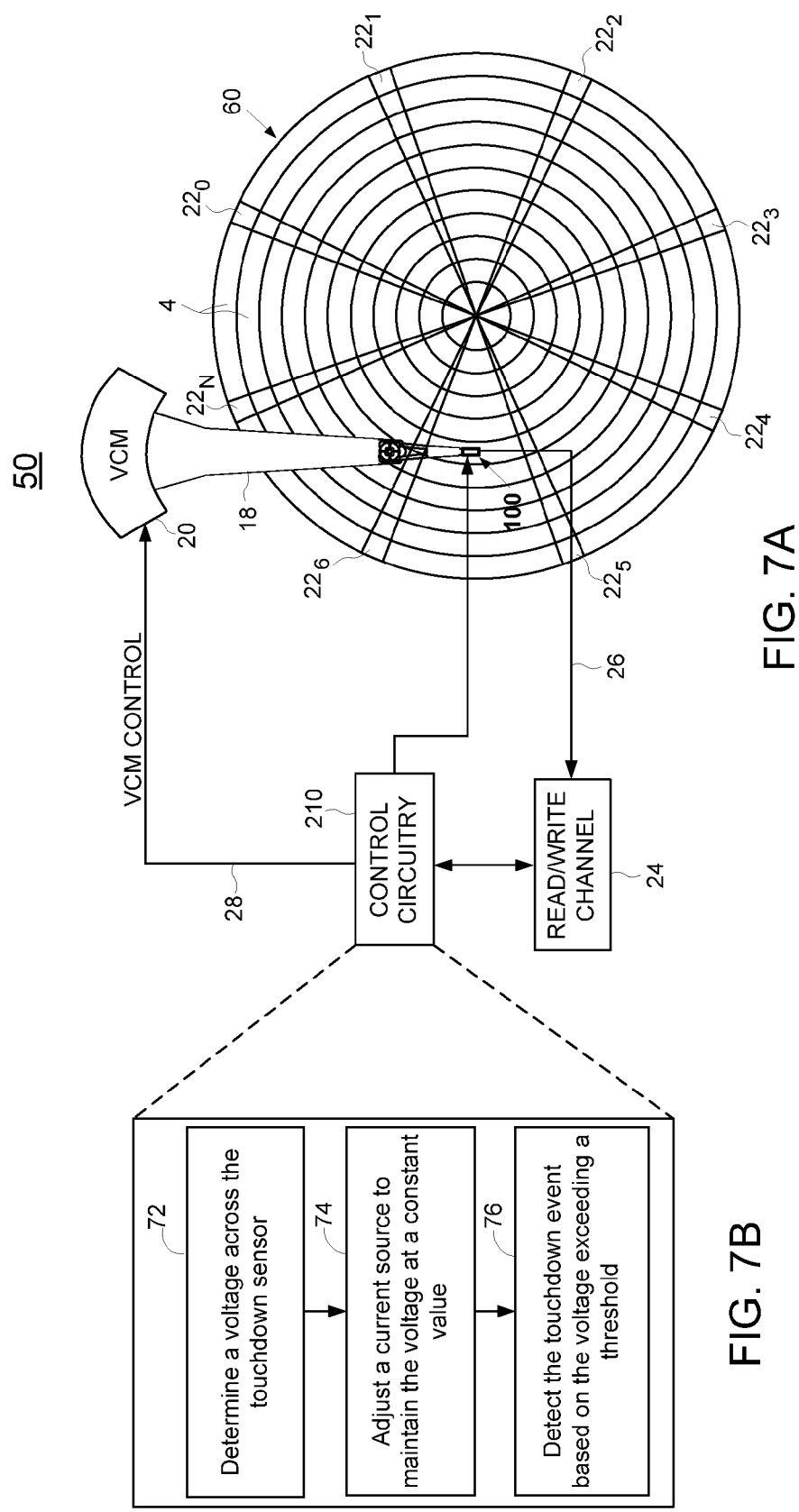
FIG. 7A shows a disk drive according to an alternative embodiment of the present invention comprising a disk, a head actuated over the disk, and control circuitry.
FIG. 7B is a flow diagram of acts executed by the control circuitry according to the alternative embodiment of the present invention.

FIG. 7A shows a disk drive 50 according to an alternative embodiment of the present invention comprising a disk or media 60 having a plurality of tracks 4, and a head 100 actuated over the disk 60. The disk drive further comprises control circuitry 210 which executes the flow diagram of FIG. 7B wherein at step 72 the control circuitry 210 determines a voltage across the touchdown sensor, at step 74 the control circuitry 210 adjusts a current source to maintain the voltage at a constant value, at step 76 the control circuitry 210 detects the touchdown event based on the voltage exceeding a threshold.

Figure 8:
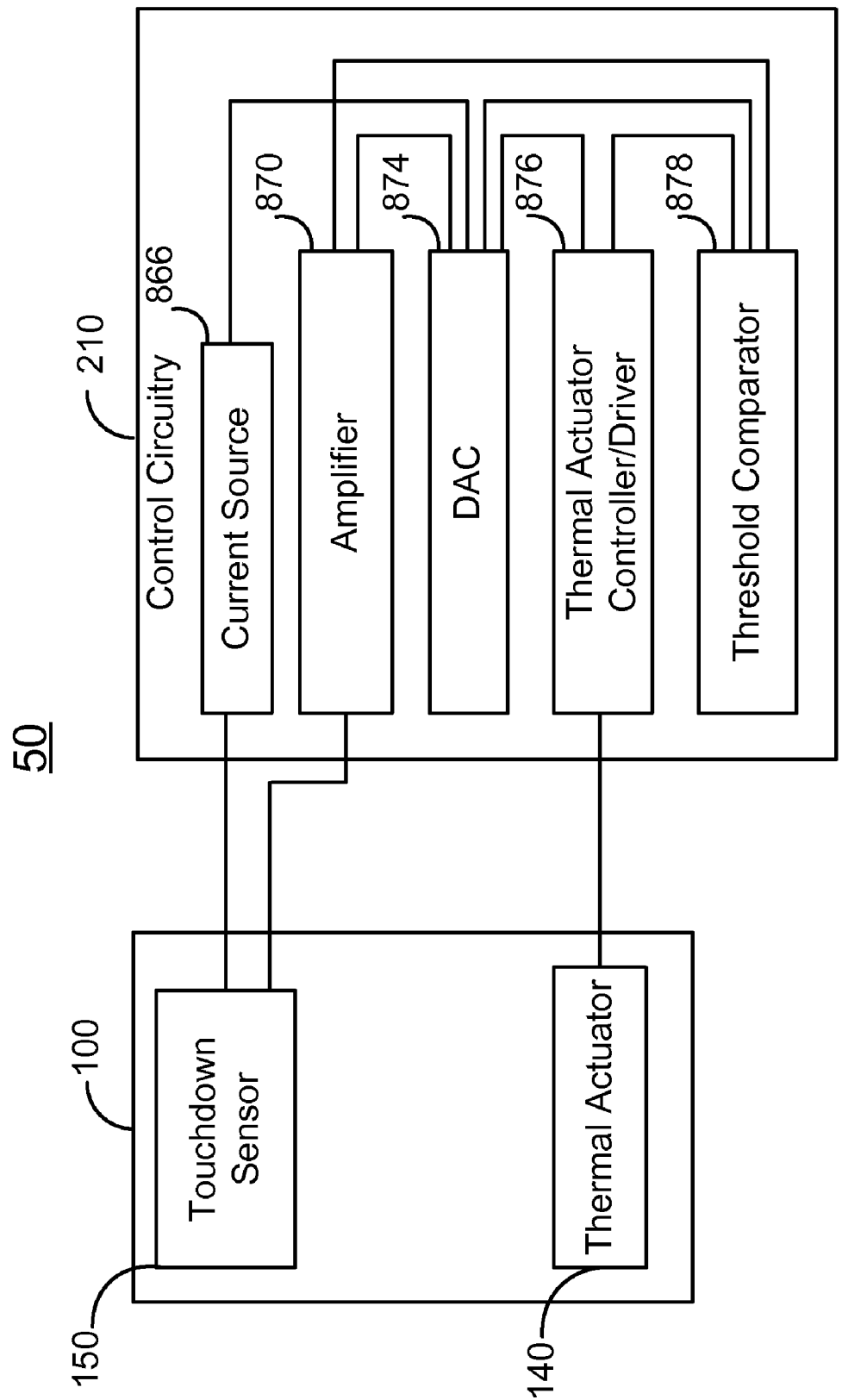
FIG. 8 depicts a block diagram of the disk drive according to the alternative embodiment comprising the head and touchdown sensor control circuitry.

FIG. 8 depicts a block diagram of the disk drive 50 according to the alternative embodiment comprising the head 100 and touchdown sensor control circuitry 210. For simplicity, certain components are omitted. The head 100 comprises the thermal actuator 140 and a single touchdown sensor 150.

The control circuitry 210 comprises a single current source 866 that is coupled to the touchdown sensor 150. The control circuitry 210 may further comprise an amplifier 870, a digital/analog converter (DAC) 874, a thermal actuator controller/driver 876, and a threshold comparator 878. In one embodiment, analog signals from the amplifier 870 may be provided to the DAC 874 to be converted to digital signals. The amplifier 870 may comprise a differential amplifier. In one embodiment the amplifier 870 may be included in a preamplifier for a read sensor or other circuitry used by the head 100.

Figure 9:
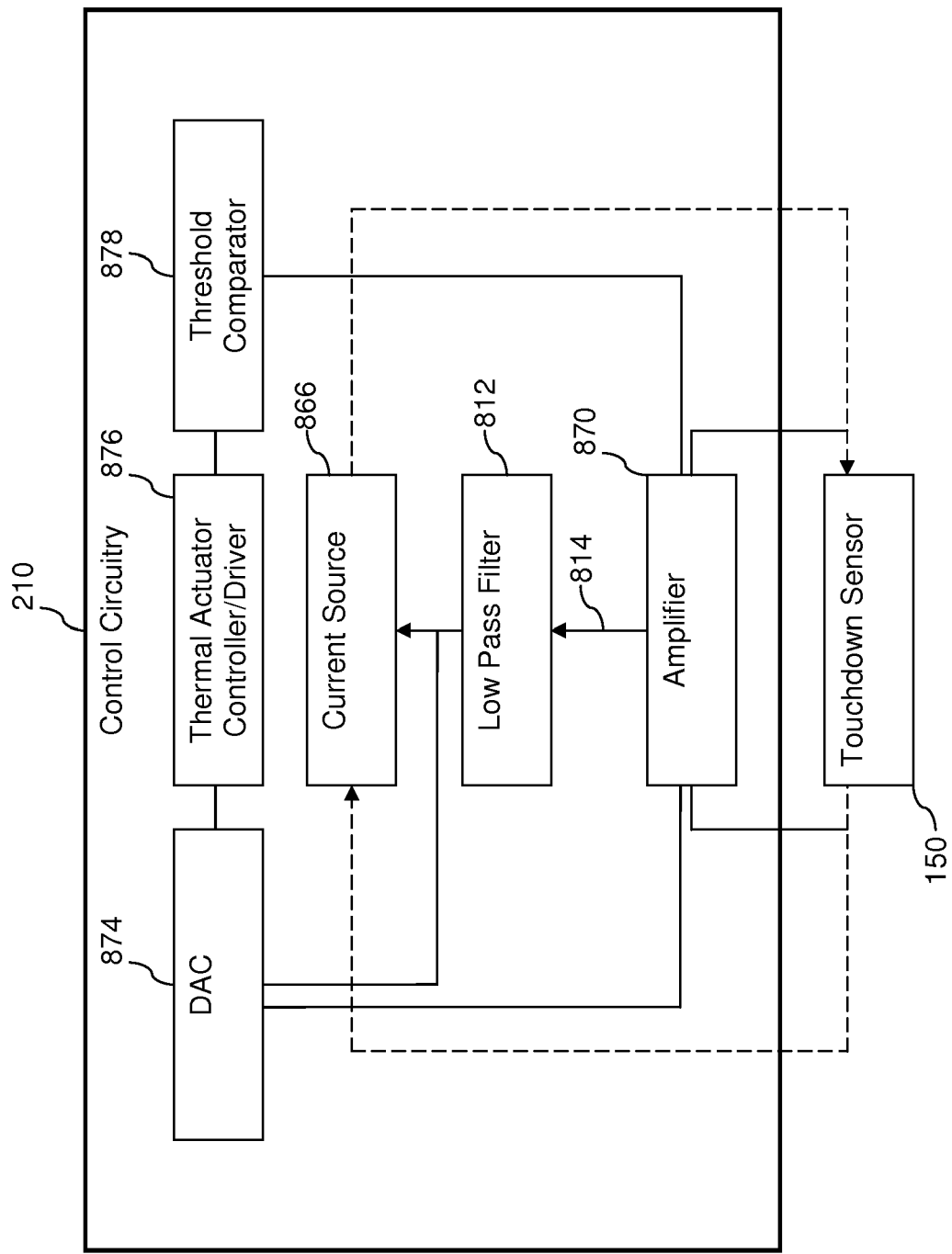
FIG. 9 depicts a schematic diagram of the control circuitry according to an embodiment of the invention.

FIG. 9 depicts a schematic diagram of the control circuitry 210 according to an embodiment of the invention. The current source 866 may be coupled to the touchdown sensor 150 to provide a drive current. The amplifier 870 may be coupled to the touchdown sensor 150 to measure a voltage. The thermal actuator controller/driver 876 may be coupled to the thermal actuator 140 (FIG. 8).

The control circuitry 210 utilizes the amplifier 870 to determine the voltage across the touchdown sensor 150. The control circuitry 210 adjusts the current source 866 to maintain the voltage at a constant value. The amplifier 870 may be coupled to current source 866 and the touchdown sensor 150 to form a feedback control loop 814 wherein the measured voltage is fed back as a control signal to the current source 866 to maintain the constant voltage across the touchdown sensor 150. The feedback control loop 814 may comprise a low pass filter 812 coupled between the amplifier 870 and the current source 866. The feedback control loop 814 may also comprise comparing the feedback voltage to a reference voltage to adjust the current source 866. The reference voltage may be provided by the DAC 874, wherein the DAC 874 provides the reference voltage to select the current produced by the current source 866.

The control circuitry 210 detects the touchdown event based on the voltage exceeding a threshold. The control circuitry 210 and the amplifier 870 may process signals received from the touchdown sensor 150. For example, the voltage signal from the touchdown sensor 150 may be compared to the threshold. The threshold may be provided via threshold setting block 878. Thus, the control circuitry 210 may determine whether the signals from the touchdown sensor 150 indicate a sufficiently large change in voltage or temperature for a sufficient interval for touchdown to be detected. Thus, through the use of the touchdown sensor 150 and control circuitry 210, touchdown may be detected.

FIG. 9 also depicts the thermal actuator controller/driver 876. The thermal actuator controller/driver 876 receives a signal from the touchdown sensor control circuitry 210 and determines the desired level of current to be driven through the thermal actuator 140 (shown in FIG. 8). The thermal actuator controller/driver 876 also provides the desired level of current to the thermal actuator 140. The thermal actuator 140 heats the head 100 by a desired amount.

In operation, when intentional touchdown is to be detected, the thermal actuator 140 is driven at an increasing current. The voltage across the touchdown sensor 150 is maintained constant by the feedback control loop 814 comprising current source 866, amplifier 870, and lowpass filter 812. The control circuitry 210 continuously monitors the voltage across touchdown sensor 150 measured by amplifier 870 as the level of thermal actuator current is increased. When touchdown has occurred, control circuitry 210 detects a sharp increase in voltage or temperature. This may be achieved by comparing the measured voltage to a threshold. In one embodiment, the frequency response of the low pass filter 812 effectively blocks the high frequency touchdown event such that the feedback control loop 814 does not respond and allows the threshold comparator 878 to detect the touchdown event.

The thermal actuator controller/driver 876 may then react, for example by reducing the current to the thermal actuator 140. The thermal actuator 140 may be driven at a lower power, and the heat in the head 100 reduced. The control circuitry 210 may be further operable to record the thermal actuator power level when the voltage exceeds the threshold. Consequently, the head 100 may fly at a small, controlled spacing above the media.

Figure 10:
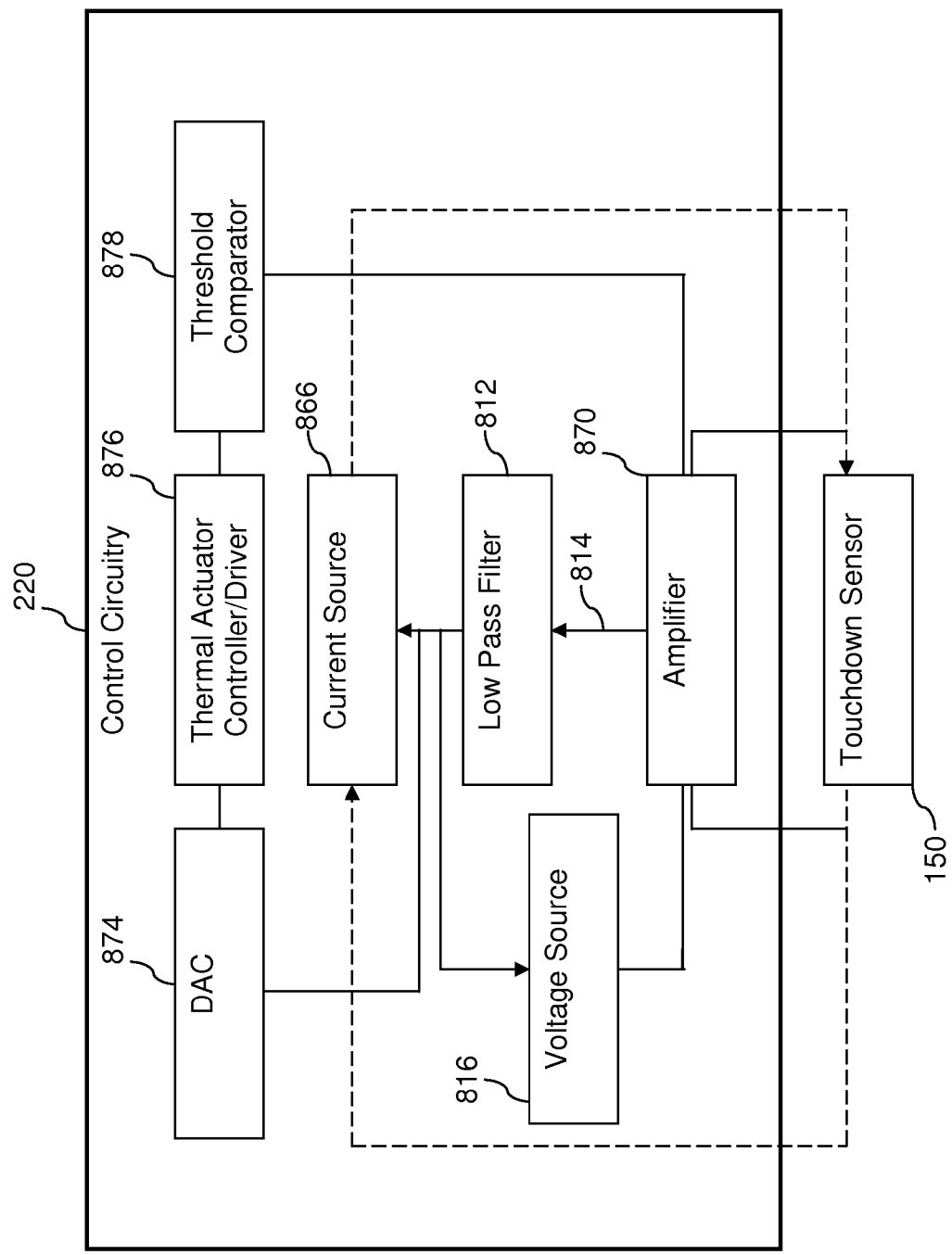
FIG. 10 depicts a schematic diagram of alternative control circuitry according to an embodiment of the invention.

FIG. 10 depicts a schematic diagram of alternative control circuitry 220 according to an embodiment of the invention. Control circuitry 220 comprises an additional offset null circuit comprising a voltage source 816 coupled in a feedback path between an output of the low pass filter 812 and an input to the amplifier 870. The voltage source 816 supplies a nulling voltage to the amplifier 870 of equal magnitude but opposite sign to the voltage measured across the touchdown sensor 150. The nulling voltage and the touchdown sensor voltage are supplied to the amplifier 870 to effectively cancel one another such that the amplifier 870 produces a zero volt output signal or some known operating point bias voltage. The frequency response of the low pass filter 812 effectively blocks the high frequency touchdown event such that the offset null circuit and the feedback control loop 814 do not respond and allows the control circuitry 220 to detect the touchdown event.

I claim:

1. A disk drive comprising:
   a disk;
   a head for writing data to the disk;
   a touchdown sensor; and
   control circuitry comprising a current source coupled to the touchdown sensor, the control circuitry operable to:
      determine a voltage across the touchdown sensor;
      adjust the current source to maintain the voltage across the touchdown sensor at a constant value; and
      detect a touchdown event based on the voltage exceeding a threshold.

2. The disk drive of claim 1, wherein the head comprises the touchdown sensor and a thermal actuator.

3. The disk drive of claim 2, wherein the threshold comprises a change of slope of the voltage across the touchdown sensor.

4. The disk drive of claim 2, wherein the control circuitry is further operable to measure a running average of a slope while adjusting a thermal actuator power level and determine when the slope changes.

5. The disk drive of claim 2, wherein the control circuitry is further operable to record a thermal actuator power level when the voltage exceeds the threshold.

6. The disk drive of claim 1, wherein the control circuitry is further operable to feedback the voltage to adjust the current source to maintain the voltage at the constant value.

7. The disk drive of claim 6, wherein the control circuitry further comprises a low pass filter for determining the voltage.

8. The disk drive of claim 7, wherein adjusting the current source comprises comparing the feedback voltage to a reference voltage.

9. The disk drive of claim 1, wherein the voltage across the touchdown sensor corresponds to a temperature.

10. The disk drive of claim 1, wherein the control circuitry comprises an amplifier.

11. The disk drive of claim 10, wherein the control circuitry further comprises an analog to digital converter coupled to the amplifier.

12. The disk drive of claim 10, wherein the control circuitry further comprises an offset null circuit coupled to the amplifier.

13. The disk drive of claim 12, wherein the offset null circuit comprises a voltage source coupled to the amplifier.

14. The disk drive of claim 13, wherein the voltage source is coupled to the amplifier and a low pass filter in a feedback control loop.

15. The disk drive of claim 1, wherein the touchdown sensor is a thermistor.

16. A method of detecting a touchdown event between a head and a medium in a disk drive comprising:
- determining a voltage across the touchdown sensor across the touchdown sensor;
- adjusting a current source to maintain the voltage at a constant value; and
- detecting the touchdown event based on the voltage exceeding a threshold.

17. The method of claim 16, wherein the head comprises the touchdown sensor and a thermal actuator.

18. The method of claim 17, wherein the threshold comprises a change of slope of the voltage across the touchdown sensor.

19. The method of claim 18, further comprising measuring a running average of the slope while adjusting a thermal actuator power level.

20. The method of claim 19, further comprising recording the thermal actuator power level when the voltage exceeds the slope.

21. The method of claim 16, wherein the touchdown sensor is a thermistor.

* * * * *